(12) United States Patent
Huang

(10) Patent No.: US 9,233,637 B1
(45) Date of Patent: Jan. 12, 2016

(54) TIE-DOWN

(71) Applicant: Han-Ching Huang, Taichung (TW)

(72) Inventor: Han-Ching Huang, Taichung (TW)

( * ) Notice: Subject to any disclaimer, the term of this patent is extended or adjusted under 35 U.S.C. 154(b) by 0 days.

(21) Appl. No.: 14/449,636

(22) Filed: Aug. 1, 2014

(51) Int. Cl.
*B21F 9/00* (2006.01)
*B66F 3/00* (2006.01)
*B60P 7/08* (2006.01)
*B65H 75/44* (2006.01)

(52) U.S. Cl.
CPC .............. *B60P 7/083* (2013.01); *B60P 7/0846* (2013.01); *B65H 75/4492* (2013.01)

(58) Field of Classification Search
CPC .............. B66D 1/26; B66D 1/30; B66D 3/02; B60P 3/079; B60P 7/083; B60P 7/0846; Y10T 24/2113; Y10T 24/2117; Y10T 24/2121; Y10T 24/2175; Y10T 24/2191
See application file for complete search history.

(56) References Cited

U.S. PATENT DOCUMENTS

| 4,324,023 | A * | 4/1982 | Prete, Jr. | 24/68 CD |
| 7,281,701 | B1 * | 10/2007 | Huang | 254/218 |
| 2006/0188354 | A1 * | 8/2006 | Bosley | 410/23 |
| 2006/0197072 | A1 * | 9/2006 | Huang | 254/217 |
| 2008/0148537 | A1 * | 6/2008 | Huang | 24/68 CD |
| 2008/0178439 | A1 * | 7/2008 | Huang | 24/68 CD |
| 2009/0047091 | A1 * | 2/2009 | Huck | 410/100 |
| 2013/0025098 | A1 * | 1/2013 | Smith | 24/68 CD |

FOREIGN PATENT DOCUMENTS

EP          2368758 A1 *   9/2011

* cited by examiner

*Primary Examiner* — Emmanuel M Marcelo

(57) ABSTRACT

A tie-down includes a frame, a handle, a reel, a bushing, two ratchet wheels and two detents. The frame includes two walls. The handle includes two blades. The reel is rotationally inserted in the blades of the handle via the walls of the frame. The bushing includes a space for receiving the reel and an opening via which a strap is wound onto the reel. The bushing further includes two annular ridges inserted in the blades of the handle via the walls of the frame so that the annular ridges protect the reel from the blades of the handle. The ratchet wheels are connected to two ends of the reel so that the ratchet wheels are rotatable with the reel. The first detent is movable on the frame for engagement with the ratchet wheels. The second detent is movable on the handle for engagement with the ratchet wheels.

4 Claims, 6 Drawing Sheets

TIE-DOWN

BACKGROUND OF INVENTION

1. Field of Invention

The present invention relates to a tie-down and, more particularly, to an efficient and robust tie-down.

2. Related Prior Art

A conventional tie-down includes a frame, a handle, a reel, two ratchet wheels and two detents. The frame includes two walls. The first detent is movably supported on the walls of the frame. The handle includes two blades. The second detent is movably supported on the blades of the handle. The reel is rotationally inserted in the blades of the handle via the walls of the frame. The ratchet wheels are connected to the reel so that they are rotatable together. The reel is inevitably worn away by the blades of the handle. Moreover, the rotation of the reel is not smooth because the reel is worn away by the blades of the handle.

Disclosed in U.S. Pat. No. 7,281,701 issued to the applicant of the present application, a tie-down includes a frame 10, a handle 20, a reel 12, two ratchet wheels 13 and two detents 14 and 22. The frame 10 includes two walls each including two arched ribs 104 or an annular rib 105. The first detent 14 is movably supported on the walls of the frame 10. The handle 20 includes two blades. The second detent 22 is movably supported on the blades of the handle 20. The reel 12 is rotationally inserted in the blades of the handle 20 via the walls of the frame 10. The ratchet wheels 13 are connected to the reel 12 so that they are rotatable together. Each of the blades of the handle 20 is rotationally supported on the arched ribs 104 or annular rib 105 of a corresponding one of the walls of the frame 10. Thus, the reel 12 is protected from the blades of the handle 20 by the arched ribs 104 or the annular ribs 105. The arched ribs 104 or the annular ribs 105 are made by punching that complicates the production of the tie-down.

Disclosed in U.S. Pat. No. 7,836,560 issued to the applicant of the present application, a tie-down includes a frame 10, a handle 20, two bushings 30, a reel 12, two ratchet wheels 13 and two detents 14 and 22. The frame 10 includes two walls each including two arched ribs 104 or an annular rib 105. The first detent 14 is movably supported on the walls of the frame 10. The handle 20 includes two blades. The second detent 22 is movably supported on the blades of the handle 20. The reel 12 is rotationally inserted in the blades of the handle 20 via the walls of the frame 10. The ratchet wheels 13 are connected to the reel 12 so that they are rotatable together. Each of the bushings 30 is inserted in a corresponding one of the blades of the handle 20 via a corresponding one of the walls of the frame 10. The blades of the handle 20 are rotationally supported on the bushings 30 that are supported on the walls of the frame 10. Thus, the reel 12 is protected from the blades of the handle 20 by the bushings 30. The bushings 30 are individually inserted in the blades of the handle 20 via the walls of the frame 10, and this process is complicated.

The present invention is therefore intended to obviate or at least alleviate the problems encountered in prior art.

SUMMARY OF INVENTION

It is the primary objective of the present invention to provide a smooth tie-down.

To achieve the foregoing objectives, the tie-down includes a frame, a handle, a reel, a bushing, two ratchet wheels and two detents. The frame includes two walls. The handle includes two blades. The reel is rotationally inserted in the blades of the handle via the walls of the frame. The bushing includes a space for receiving the reel and an opening via which a strap is wound onto the reel. The bushing further includes two annular ridges inserted in the blades of the handle via the walls of the frame so that the annular ridges protect the reel from the blades of the handle. The ratchet wheels are connected to two ends of the reel so that the ratchet wheels are rotatable with the reel. The first detent is movable on the frame for engagement with the ratchet wheels. The second detent is movable on the handle for engagement with the ratchet wheels.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF PREFERRED EMBODIMENT

Figure 1:
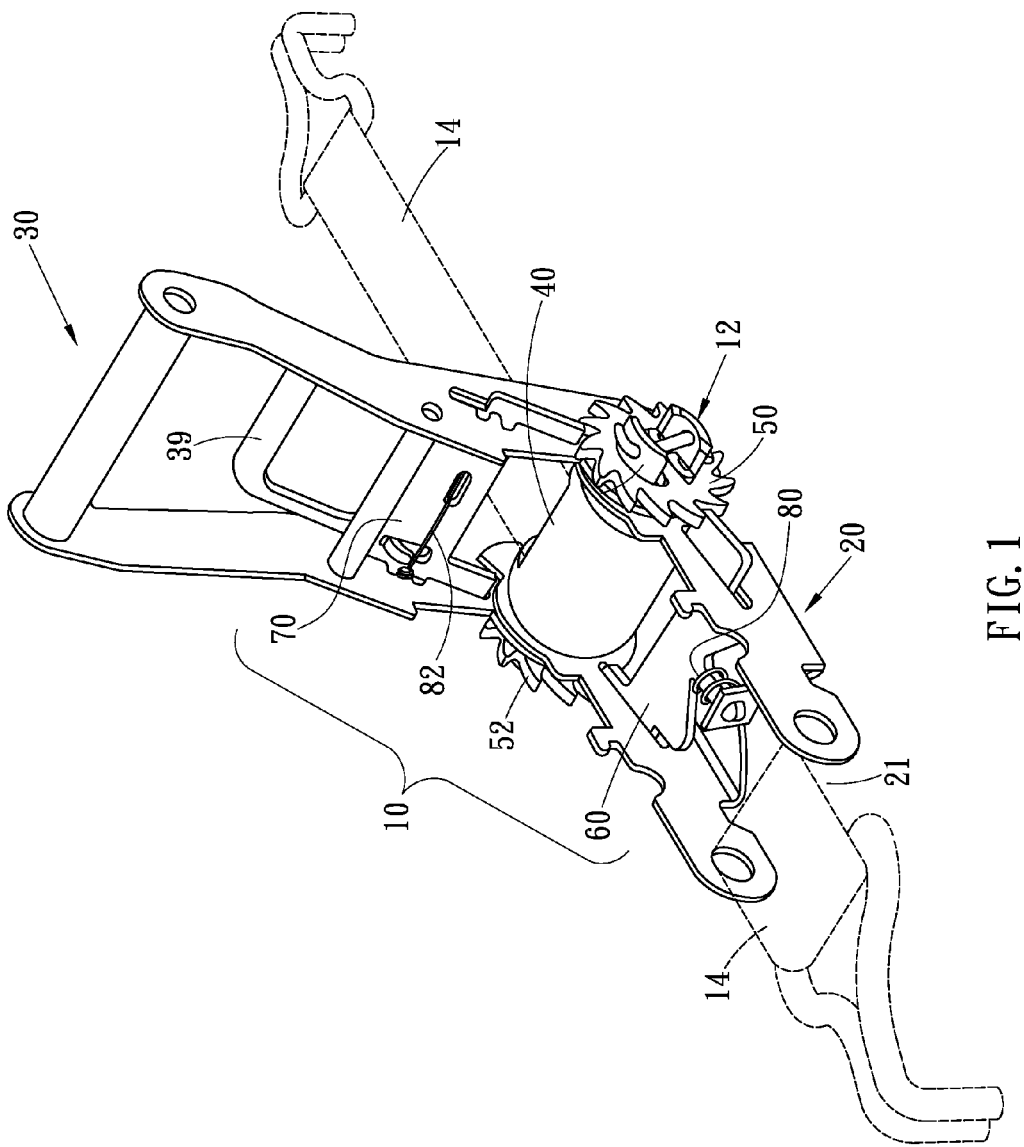
FIG. 1 is a perspective view of a tie-down according to the first embodiment of the present invention.
Figure 2:
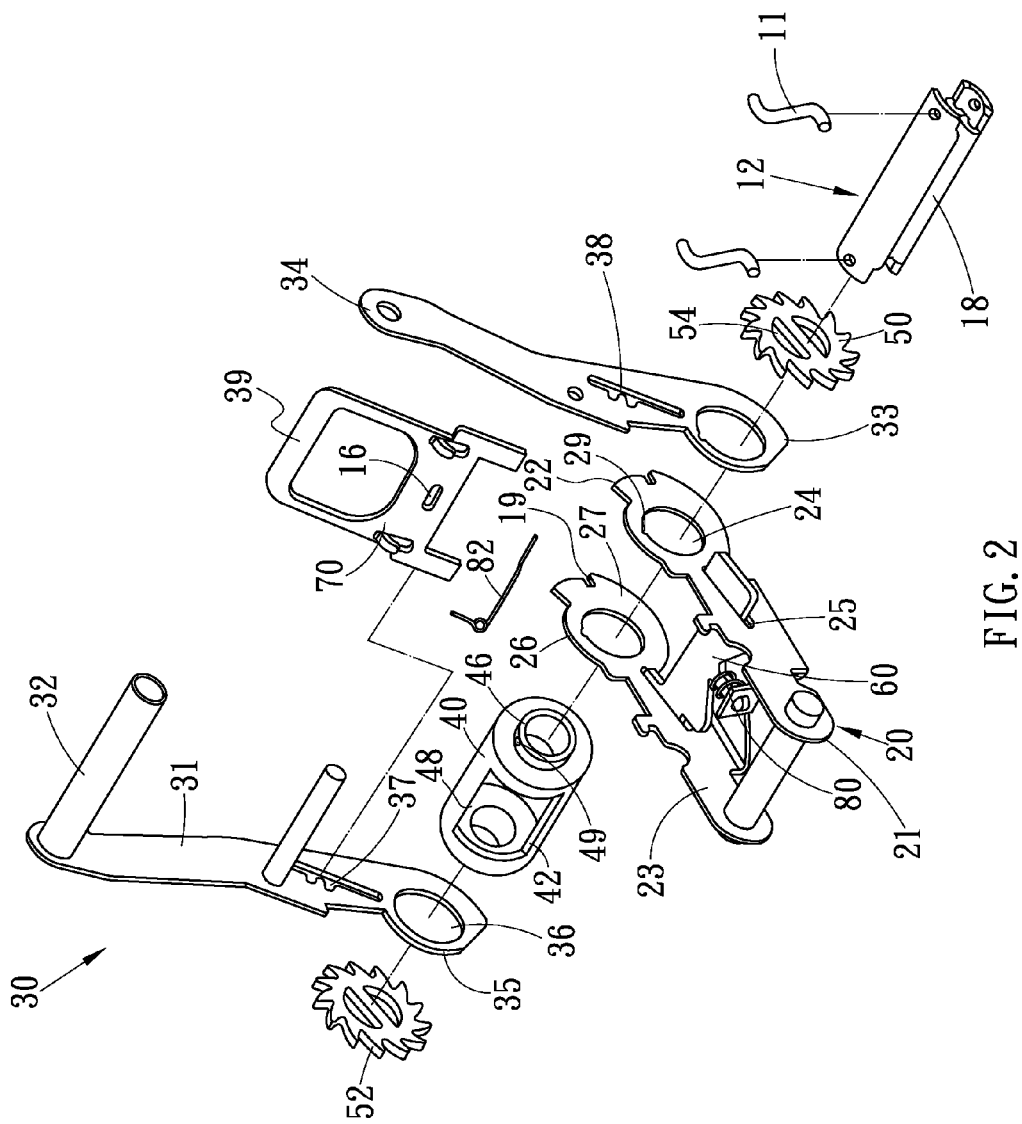
FIG. 2 is an exploded view of the tie-down shown in FIG. 1.

Referring to the FIGS. 1 through 4, a tie-down 10 includes a frame 20, a reel 12, two ratchet wheels 50, a handle 30, a bushing 40, a first detent 60 and a second detent 70 according to a first embodiment of the present invention.

The frame 20 includes two walls 23. Each of the walls 23 includes a first end 21, a second end 22, an aperture 24 made near the second end 22, a recess 29 in communication with the aperture 24, a slot 25 made between the first end 21 and the second end 22, a winding portion 26 made near the second end 22, and a releasing portion 27 made near the winding portion 26. The winding portion 26 is an arched edge. The releasing portion 27 is raised from the winding portion 26, with a shoulder (not numbered) formed between the releasing portion 27 and the winding portion 26. A cutout 19 is made in the releasing portion 27. A crossbar (not numbered) is connected to both of the walls 23 near the first end 21.

The handle 30 includes a grip 32 supported on two blades 31. Each of the blades 31 of the handle 30 includes two ends 33 and 34, a cam 35 formed at the first end 33, a slot 37 made therein, and a boss 38 formed in the slot 37. An aperture (not numbered) is made in each of the cams 35.

The bushing 40 includes a space 48 made therein, an opening 42 made in the periphery, two discs 44 each formed at an end, two annular ridges 46 each extending from a corresponding one of the discs 44, and two bosses 49 each formed on a corresponding one of the annular ridges 46. The opening 42 is in communication with the space 48. The annular ridges 46 are inserted in the apertures 36 of the handle 30 through the apertures 24 of the frame 20. The bosses 49 are inserted in the recesses 29 so that the bushing 40 are not rotatable on the frame 20.

The reel 12 includes two bars 18 connected to each other by two pins 11. The reel 12 is rotationally inserted in the apertures 36 of the handle 30, the bushing 40 and the apertures 24 of the frame 20. The annular ridges 46 of the bushing 40 are inserted in the apertures 36 of the handle 30.

A strap 14 can be wound on the reel 12. The strap 14 includes an end connected to the reel 12 and another end connected to a hook (not numbered).

Each of the ratchet wheels 50 includes a plurality of ratchets 52 formed thereon and two crescent openings 54 made therein. Each of the crescent openings 54 receives an end of a corresponding one of the bars 18. The ratchet wheels 50 are non-rotationally connected to the reel 12.

The first detent 60 includes two fins (not numbered) movably inserted in the slots 25 of the walls 23 of the frame 20 for engagement with the ratchets 52 of the ratchet wheels 50. A compression spring 80 is compressed between the first detent 60 and a tab raised from the floor of the frame 20 for keeping the fins of the first detent 60 engaged with the ratchets 52.

The second detent 70 includes two fins (not numbered) movably inserted in the slots 37 of the blades 31 of the handle 30 for engagement with the ratchets 52 of the ratchet wheels 50. The second detent 70 includes a grip 39 formed thereon and an aperture 16 therein.

A torque spring 82 is provided between the second detent 70 and a portion of the handle 30 for keeping the fins of the second detent 70 engaged with the ratchets 52. The torque spring 82 includes a helical portion formed between two ends. The helical portion of the torque spring 82 is mounted on the boss 38 of one of the blades 31 of the handle 30. The first end of the torque spring 82 is located against the wall of the handle 30. The second end of the torque spring 82 is located against the second detent 70 and inserted in the aperture 16 of the second detent 70.

Figure 3:
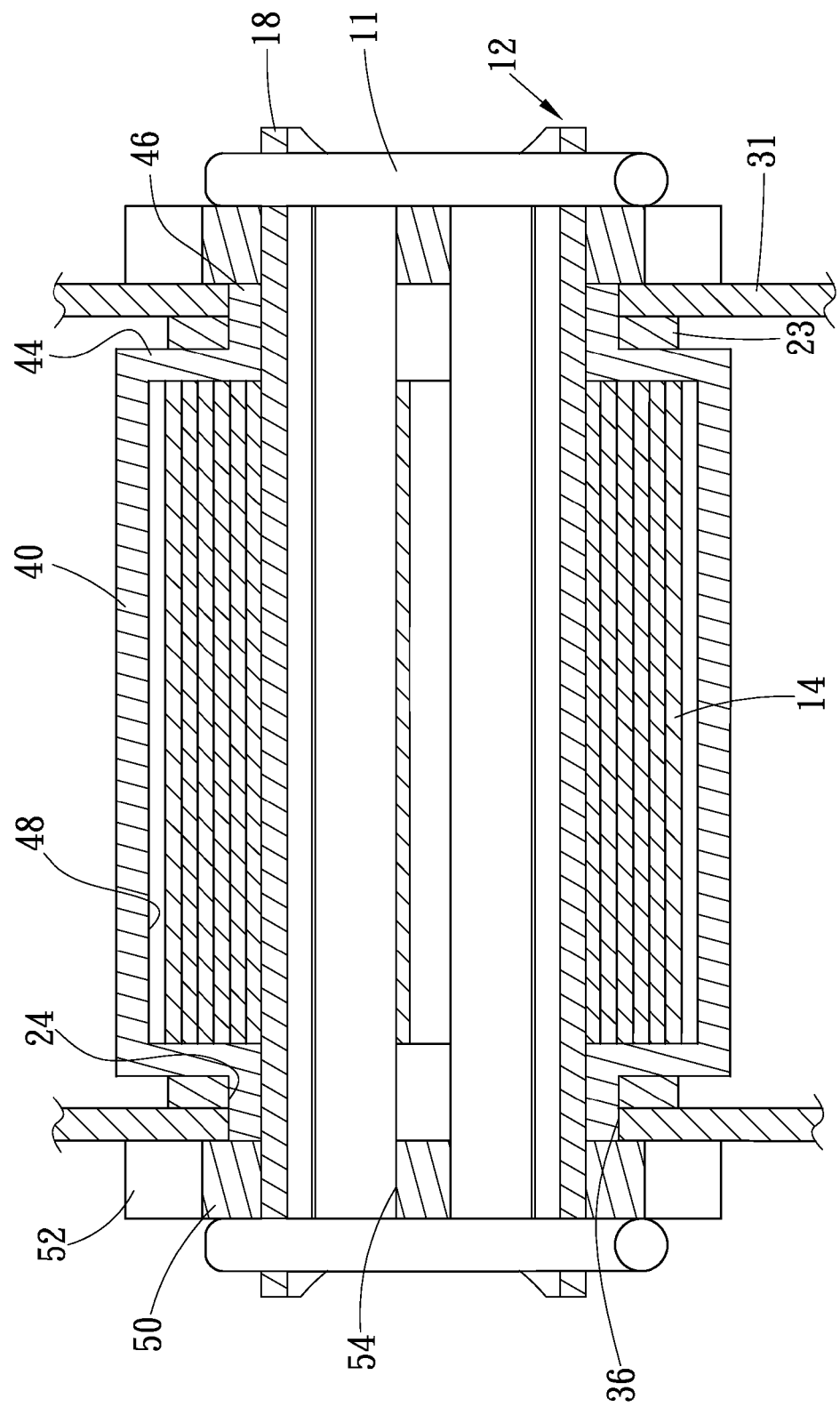
FIG. 3 is a cross-sectional view of the tie-down shown in FIG. 1.
Figure 4:
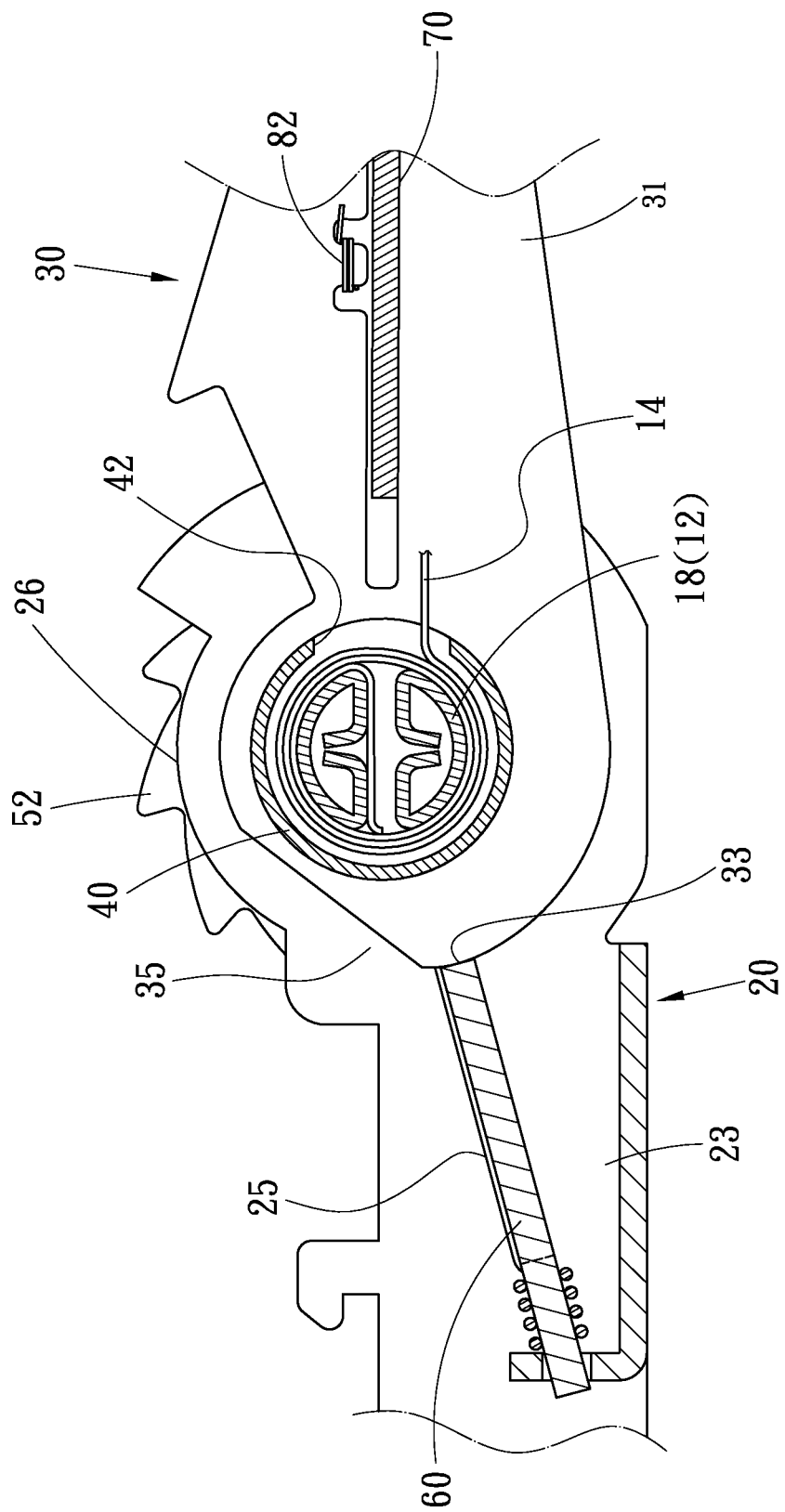
FIG. 4 is another cross-sectional view of the tie-down shown in FIG. 1.

Referring to FIG. 3, the discs 44 of the bushing 40 are placed against the walls 23 to keep the bushing 40 on the frame 20. Moreover, the discs 44 of the bushing 40 keep the strap 14 neat on the reel 12 to ensure smooth reeling of the strap 14. The reel 12 is protected from the blades 31 of the handle 30 by the annular ridges 46 inserted in the apertures 36. The reel 12 is smoothly rotatable since it is not clamped by the frame 20 and the handle 30.

Figure 5:
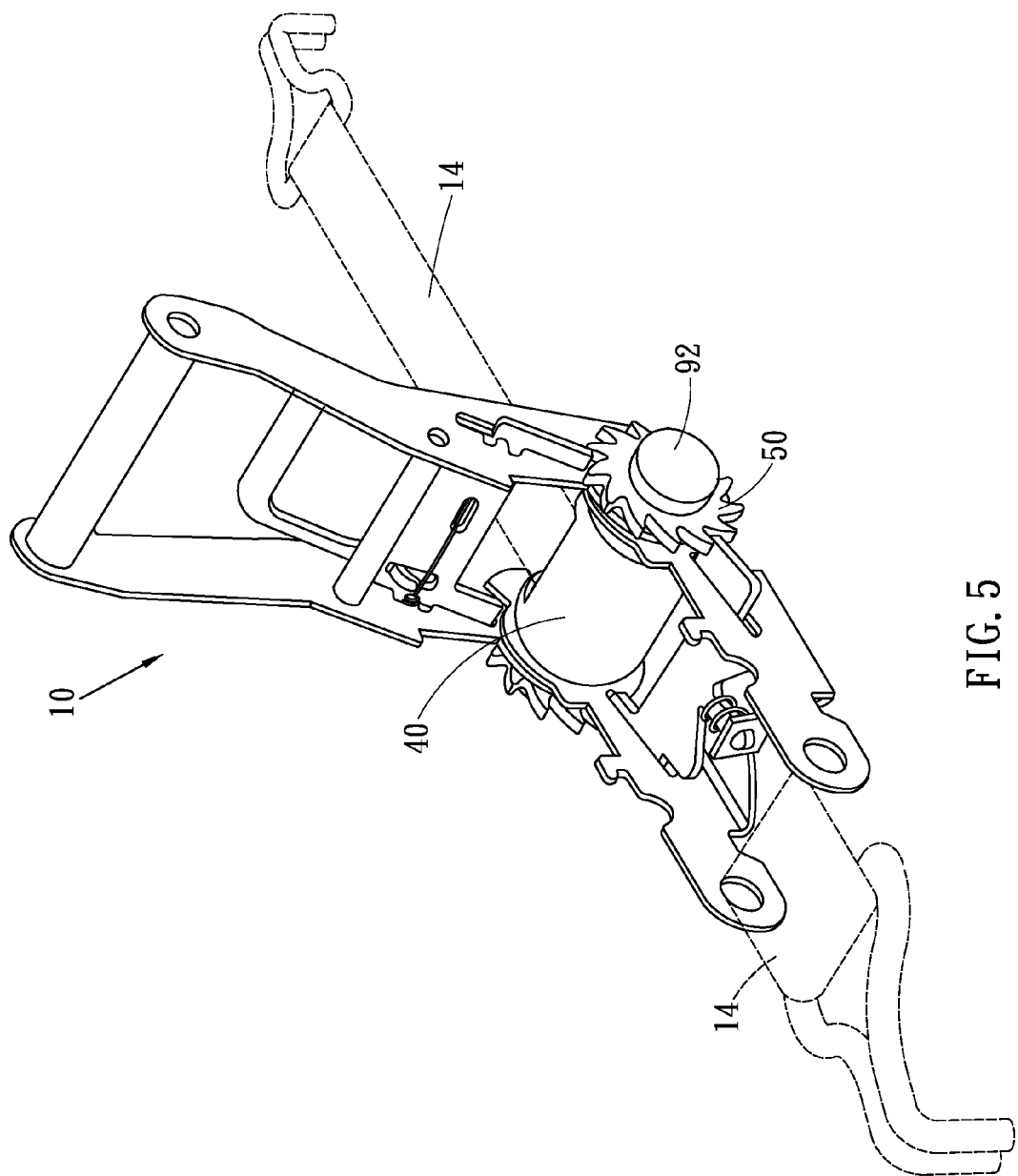
FIG. 5 is a perspective view of a tie-down according to the second embodiment of the present invention.
Figure 6:
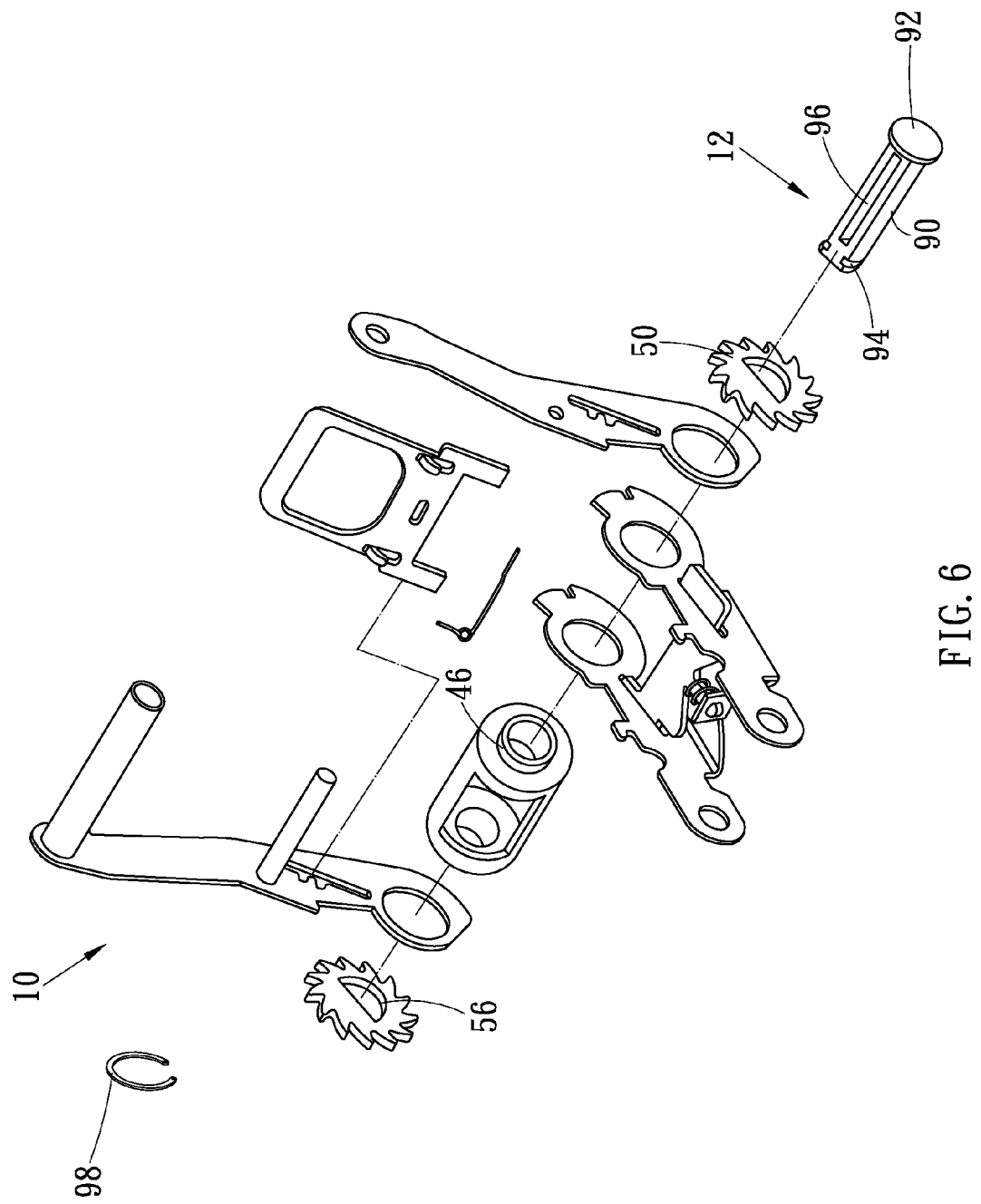
FIG. 6 is an exploded view of the tie-down shown in FIG. 5.

Referring to FIGS. 5 and 6, there is a tie-down 10 according to a second embodiment of the present invention. The second embodiment is different from the first embodiment in that the reel 12 includes a semi-cylindrical element 90 instead of the bars 18. The semi-cylindrical element 90 includes a slot 96 for receiving the strap 14. The semi-cylindrical element 90 further includes an enlarged head 92 formed at an end and a groove 94 made near another end. A C-clip 98 is disposed in the groove 94. Accordingly, each of the ratchet wheels 50 includes a crescent aperture 56 for receiving the semi-cylindrical element 90.

The tie-down 10 according to the present invention exhibits several advantages. Firstly, the reeling out is smooth, since the bushing 40 is provided to keep the reel 12 from the handle 30. Secondly, the making of the tie-down 10 is easy because only a single bushing 40 is mounted.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A tie-down comprising:
   a frame including two walls;
   a handle including two blades;
   a reel rotationally inserted in the blades of the handle via the walls of the frame;
   a bushing including:
      two discs each formed at an end and located against a corresponding one of the walls of the frame;
      a space for receiving the reel;
      an opening via which a strap is wound onto the reel; and
      two annular ridges inserted in the blades of the handle via the walls of the frame so that the annular ridges protect the reel from the blades of the handle;
   two ratchet wheels connected to two ends of the reel so that the ratchet wheels are rotatable with the reel;
   a first detent movable on the frame for engagement with the ratchet wheels; and
   a second detent movable on the handle for engagement with the ratchet wheels.

2. The tie-down according to claim 1, wherein each of the walls of the frame includes a recess, wherein the bushing includes two bosses inserted in the recesses of the walls of the frame to prevent the bushing from rotation on the frame.

3. The tie-down according to claim 1, wherein the discs of the bushing keep the strap neat on the reel to ensure smooth reeling of the strap.

4. A tie-down comprising:
   a frame including two walls;
   a handle including two blades;
   a reel rotationally inserted in the blades of the handle via the walls of the frame;
   a bushing including:
   a space for receiving the reel;
      an opening via which a strap is wound onto the reel; and
      two annular ridges inserted in the blades of the handle via the walls of the frame so that the annular ridges protect the reel from the blades of the handle;
      two ratchet wheels connected to two ends of the reel so that the ratchet wheels are rotatable with the reel;
   a first detent movable on the frame for engagement with the ratchet wheels; and
   a second detent movable on the handle for engagement with the ratchet wheels, wherein the frame, the handle and the bushing are located between the ratchet wheels.

* * * * *